United States Patent [19]

Wu et al.

[11] Patent Number: 5,774,551

[45] Date of Patent: Jun. 30, 1998

[54] PLUGGABLE ACCOUNT MANAGEMENT INTERFACE WITH UNIFIED LOGIN AND LOGOUT AND MULTIPLE USER AUTHENTICATION SERVICES

[75] Inventors: Tajen R. Wu, Fremont; William A. Shannon, Los Altos; Paul Fronberg, Redwood City; Donald R. Stephenson, Pleasanton; Vipin Samar, Cupertino, all of Calif.

[73] Assignee: Sun Microsystems, Inc., Mountain View, Calif.

[21] Appl. No.: 499,487

[22] Filed: Aug. 7, 1995

[51] Int. Cl.$^6$ ........................................................ H04L 9/32
[52] U.S. Cl. ................................................................. 380/25
[58] Field of Search ................................................ 380/25

[56] References Cited

U.S. PATENT DOCUMENTS

| | | | |
|---|---|---|---|
| 4,851,994 | 7/1989 | Toda et al. | 364/200 |
| 5,032,979 | 7/1991 | Hecht et al. | 380/4 X |
| 5,241,594 | 8/1993 | Kung | 380/4 |
| 5,263,157 | 11/1993 | Janis | 380/4 X |
| 5,276,444 | 1/1994 | McNair | 340/825.33 |
| 5,553,239 | 9/1996 | Heath et al. | 380/25 X |

*Primary Examiner*—Gilberto Barron, Jr.
*Attorney, Agent, or Firm*—Fenwick & West LLP

[57] ABSTRACT

A system and method provide transparent access from any system entry service to multiple account management services, and particularly to multiple authentication services on a computer system, supporting unified login and logout. Transparency between system entry services and account management services, including authentication, password, account, and session services, is provided by an application programming interface and a configuration file. The configuration file stores associations between system entry services, and selected account management services, and allows an individual system entry service to be associated with multiple different ones of a given type of account management service, such as authentication services. The application programming interface determines dynamically in response to a request by a system entry service for an account management operation, such as authentication of a user, which account management service is associated with the system entry service by reading the configuration file and queuing pathnames stored therein of the account management services associated with the system entry service currently connecting user to the system. The application programming interface then invokes the queued pathnames for the desired operation. Multiple login is provided by encrypting authentication tokens used by the authentication services associated with a given system entry service with a primary authentication token of one of the authentication services, and subsequently decrypting the encrypted tokens as needed to authenticate the user. With unified login, the user need only provide the primary authentication token. Unified logout is provided by locating and destroying credentials of the user created by the multiple authentication services in response to a request of the valid user to logout.

26 Claims, 6 Drawing Sheets

PLUGGABLE ACCOUNT MANAGEMENT INTERFACE WITH UNIFIED LOGIN AND LOGOUT AND MULTIPLE USER AUTHENTICATION SERVICES

BACKGROUND

1. Field of the Invention

The invention relates generally to methods and systems for managing user access to networked computers, and more particularly, to methods and systems that support the use of user authentication, account, password, and session management services.

2. Background of the Invention

Many computer systems, particularly networked computer systems supporting many users, generally employ some form of an account management system to track authorized users of the system, the type of account each user has, including what services or resources are available to the user, each user's password, and the details of each session the user has on the computer system. One of the critical aspects of account management is the authentication of users attempting to access the computer system.

Conventional networked computer systems typically provide in an account management system one or more mechanisms that authenticate the identity of a user attempting to access the system. The authentication services typically rely on data that is uniquely associated with a user to establish the user's identity. Conventional authentication services include various password or key-based protocols such as DES, Kerberos, Diffie-Hellman; biometric systems, such as retina scans, fingerprint scans, and voiceprint analysis; challenge/response systems that require the user to respond to a varying coded prompt with an appropriate response algorithmically dependent on the prompt; and hardware devices such as smart-cards encoded with information particular to the user. One factor authentication systems use a single authentication service to authenticate the user. Multifactor systems combine authentication services, such as a password and a retina scan.

Most computer systems support various types of system entry services, such as UNIX® login, ftp, telnet, passwd, rlogin, and the like. These system entry services are generally coupled directly to the authentication service, whether one factor or multi-factor, to authenticate users during the initial connection and authentication process. The authentication service is generally accessed through hard coded rules or linkages in the source code of each of the system entry services. If multiple authentication services are used to increase the security of the computer system, then each system entry service must be coded or otherwise directly linked with each authentication service.

One problem with this approach is that it results in a very specific combination of authentication services, and requires source code modification of the system entry services in order to couple them to the authentication services. Second, as the strength of existing authentication services declines over time, and as new authentication technologies are developed, a hard-coded approach severely limits system administrator's ability to incorporate new authentication services into the authentication system. Third, in this approach the system entry services are not truly independent of the authentication services, but rather effectively integrated with them. The system administrator is unable to easily specify the use of particular authentication services for a given type of system entry service since all system entry services use the same authentication services. The lack of independence further hampers the adaptability of the computer system, and increases the difficulty of system maintenance. These problems also apply to the other aspects of the account management system, such as the session, password, and account components that separately administer these aspects of the user's interaction with the computer system.

For any computer security system to be successful, it must be easy to use. However, in conventional systems where multiple authentication services are used to authenticate the user, the user must typically remember or provide an authentication token, for each authentication system. Authentication tokens include password, public keys, private keys, smart card personal identification numbers, biometric data such as retinal scans, fingerprints, voiceprint, and the like. This requirement typically makes it difficult for the user to access the system, especially where each authentication service has different requirements for allowable characters, length of key, age restrictions on keys, and other particular parameters. The use of multiple authentication tokens may be particularly difficult for novice users who are not familiar with the underlying system security policies or authentication services.

Another problem with the use of multiple authentication services arises when the user attempts to logout and terminate their session. When a user is authenticated, the user's credentials, including the user's authentication token, are typically stored on the system. Storing the credentials is generally part of the security system of the computer, and allows a system administrator to determine who is currently logged into the computer, which resources are being used, and other account related information. Currently, there is not provided a single logout mechanism that locates and destroys the credentials created by the various authentication services used to authenticate the user. Rather, the user currently must manually destroy the credentials by invoking for each authentication service the appropriate function to remove the credentials created by that authentication service. For example, to destroy credentials created by a Diffie-Hellman authentication service, the user must invoke Keylogout on a UNIX® system which locates the private key of the user and removes it. Similarly, on a UNIX® system with a Kerberos authentication service, the user must invoke kdestroy. Other authentication services have their own particular key removal or destruction process.

Manual destruction of credentials presents several problems. First, it eliminates the transparency of the authentication services to the user. One of the essential ideas in providing a multiple authentication system is that the separate services are transparent to the user, who needs only to initiate their login process for whatever type of connection being made. Requiring the user to then directly interact with the underlying authentication services by invoking multiple different commands removes the transparency, and thus the ease of use of the authentication system as a whole. Second, while the user could modify a UNIX® logout file, or similar file on other systems, that contains a number of processes to execute on logout, this requires that the user have a high degree of familiarity with the particular authentication services, and the configuration of system files and scripts. This high level of training is not applicable to the broad variety of users of such system. Third, modification of logout files to initiate logouts of all authentication services would result in logging out the user from all current sessions, even if the user desires only to logout of one session. This is an undesirable side effect that may frustrate many users, as they would be required to login again to re-establish one of the sessions.

Accordingly, it is desirable to provide a system and method that separates the system entry services from the account management system in such a way that any combination of particular account management services may be specified for use with particular system entry services, such that the use of the account management services is transparent to the system entry services, and the user. In particular, it is desirable to provide a system that allows specific system entry services to be associated with selected authentication services in an easily configurable, flexible manner. It is also desirable to provide a system and method where user is able to employ a single authentication token with any number multiple authentication services to obtain a unified login. It is finally desirable to provide a system to provide unified logout so that the user does not have to manually logout and destroy credentials created during the authentication process.

SUMMARY OF THE INVENTION

The present invention overcomes the foregoing various limitations by providing an application programming interface that mediates between the system entry services and the account management services on a computer, and a facility that stores service associations between each system entry service and selected ones of the account management services. The application programming interface receives invocations from a given system entry service for a given type of functionality, determines which particular account management services are associated with the invoking system entry service, any restrictions or parameters of such association, and then invokes the appropriate account management service to provide the requested functionality. In a preferred embodiment the service associations are stored in a configuration file, but other types of storage facilities may also be used. The application programming interface is "pluggable" because any number of different account management services may be accessed by the application programming interface through the service associations. Thus, the application programming interface transparently and dynamically links a particular requested operation of a particular system entry service with the appropriate account management service, or services for providing that operation. The application programming interface is here called a pluggable account management interface.

The configuration file or other facility managing the service associations allows for the establishing associations between a given system entry service and multiple instances of a given account management service type, such as authentication, session, and the like. The ability to provide such multiple associations is called "stacking." Stacking account management services is particularly useful with authentication services, providing multiple authentication services for any given system entry service, without the need to modify the source code of each system entry service to provide such relationships.

Stacking of authentication services further supports unified login and logout. Unified login is accomplished through a authentication token mapping process. This process uses a user's primary authentication token for a primary authentication service, such as a password, private key, or other unique data, to encrypt the user's other authentication tokens for other secondary authentication services. The encrypted authentication tokens, along with data indicating which authentication services they are associated with, are stored in an available storage facility, such as a user context, naming service, smart card, or the like. In this manner, the user need only remember or provide a single authentication token to the computer system, even though multiple authentication services are supported.

The present invention further provides for unified logout in a transparent and easy to use and administer fashion by providing a transparent credential destruction process that handles the identification and removal of a user's credentials during a single logout process. The credential destruction process may be implemented either as an additional service separate from each of the authentication services that create the credentials, or it may be incorporated into each authentication service as appropriate. The pluggable account management interface determines which authentication service, or other service that is selected for providing destruction of credentials. The pluggable account management interfaces invokes of such service to provide a credential destruction process. The credential destruction process determines the user requesting destruction of the credentials, verifies that the user is the actual user for those credentials, locates the credentials as stored by the authentication service, and removes them from the system. In conjunction with the pluggable account management interface, the credential destruction process operates without the user having to manually invoke particular services to destroy the credentials.

With the pluggable account management interface, unified login and logout together provide substantial improvements in the ease of use of otherwise complex computer security systems. This is particularly important as computer systems are increasingly used in organizations with many novice users for whom it is not possible or efficient to provide extensive, detailed training on the underlying commands and use of the computer system's various account management services. Further, the use of the service associations in the configuration file, or other storage facility substantially increases ease of system administration and the flexibility of the computer system.

DETAILED DESCRIPTION OF THE INVENTION

System Architecture

Figure 1:
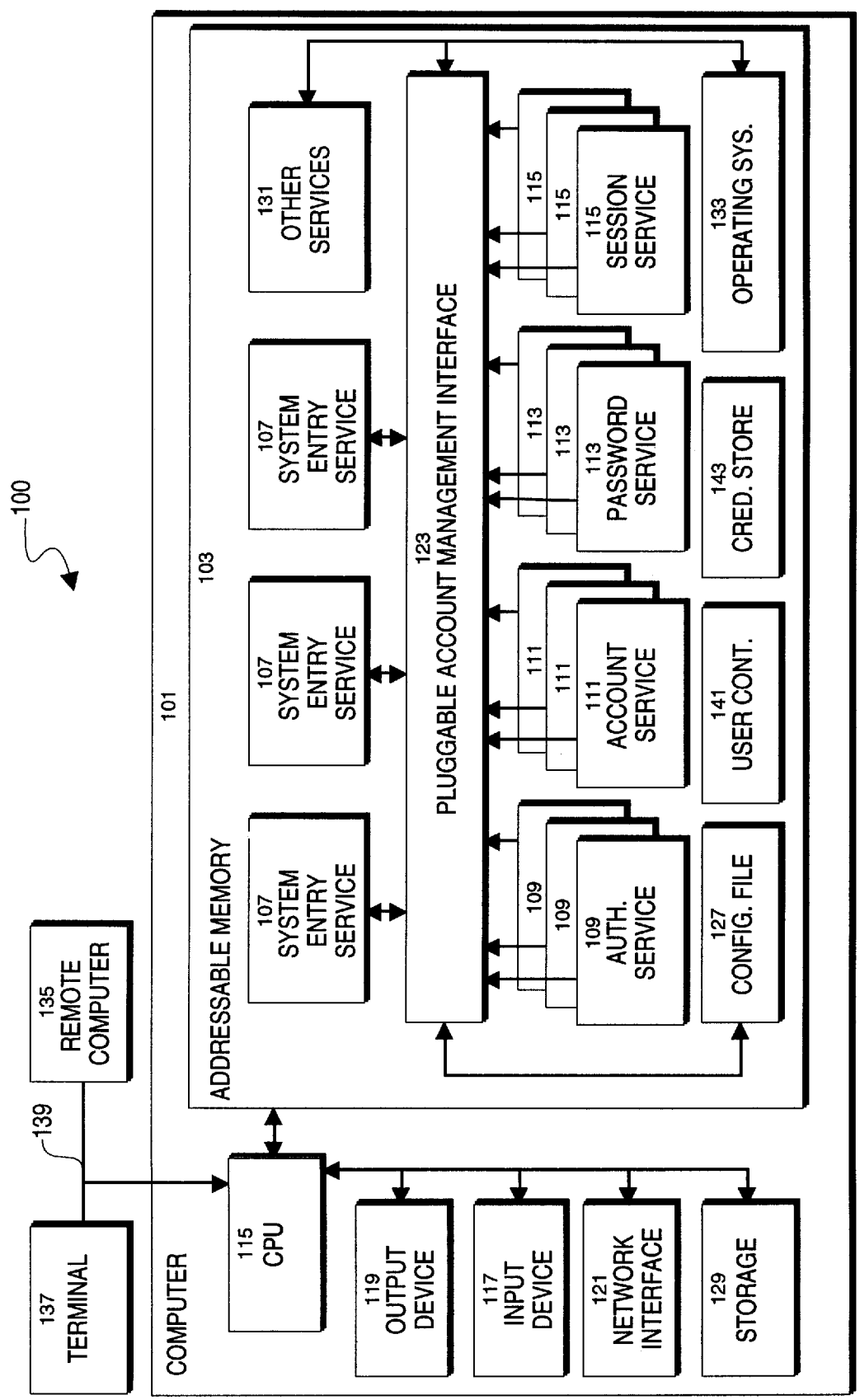
FIG. 1 is a block diagram of a computer system including the pluggable account management interface of the present invention.

Referring now to FIG. 1, there is shown one embodiment of a computer system providing a pluggable account management interface with unified login and logout, and multiple authentication services. The system 100 includes a computer 101, having an addressable memory 103, a processor 115, input 117 and output devices 119, a network interface 121, and a mass storage device 129. Users may connect through the network interface 121 to the computer system 100 over a network 139, such a LAN, WAN, or the like, from either a remote computer 135, or a terminal 137, or other similar device.

The addressable memory 103 further includes a number of system entry services 107, a number of authentication services 109, account services 111, password services 113, and session services 115. These services are jointly referred to as account management services. Each such service provides particular functionality in managing the accounts of the users of the system 100, as further described below. The addressable memory 103 further includes a pluggable account management interface 123, and a set of other services 131 available to authorized users of the computer 101. The other services 131 include any type of application, files, or data. Storage for user credentials is provided by a credential store 143, or may provided in other storage facilities, both private, for example, a smart card, or public. Storage for encrypted authentication tokens is preferably provided in a user context 141 or other similar facility.

The computer 101 may be realized by most general purposes computers, such as a SPARCstation™ computer manufactured by Sun Microsystems, Inc. of Mountain View, Calif. Any other general purpose computer may also be adapted for use with the invention. Computer 101 executes a general purpose operating system 133, such as Sun Microsystems' Solaris® operating system, resident in the addressable memory 103. The operating system 133 and various services provided in the addressable memory 103 are executed by the processor 115 in a conventional manner. The processor 115 also reads and writes data and code files to and from the mass storage device 129.

System Entry Services

The computer 101 includes one or more system entry services 107. The system entry services 115 are invoked by the processor 115 and the operating system 133 when a user attempts to access the computer 101. The system entry services 115 include, for example, UNIX® login, sulogin, dtlogin, rlogind, uucpd, ftp, telnet, and the like. Generally, each system entry service 107 includes as attributes connection data describing the operational, network, and connection parameters used by the system entry service 107 to connect to the computer 101 via the network 139.

Each system entry service 107 generally includes a method that provides the necessary processing to establish a connection over the network 139, telecommunication lines, or the like between the user's computer 135 or other device, and the computer 101. Such a method may be internal to the system entry service 107, or may provide an external interface to the user; for the purposes of this disclosure the method used by each system entry services 107 to connect a user to the computer 101 is here generally labeled the "connect method." It is understood by those of skill in the art that the actual method names employed by any of the services referred to herein may vary in actual practice; the names are chosen here to be representative of the functionality. The connect method performs useful handshaking and error-checking to establish a networked connection for a user. The connect method further provides transaction control over other set up functions, including authentication, account validation, and the like. The process of connecting to the computer 101 via the connect method is further described below with respect to FIG. 3.

Each system entry service 107 further includes a method that terminate the user's session on the computer. This method, here called "disconnect," may be explicitly invoked by the user, for example with the "bye" command during an ftp session, or implicitly invoked by the operating system 133, for example where the user simply turns off his computer. The disconnect method terminates or completes any processes that the user has initiated, and severs the connection between the user and the computer 101. The process of disconnecting from the computer via the disconnect method is further described below with respect to FIG. 5.

Pluggable Account Management Interface

Intermediating between the system entry services 107 and the various account management services is a pluggable account management interface 123. The pluggable account management interface 123 allows any system entry service 107 to be used transparently with any combination of account, password, session, or authentication services 109, including multiple instances of a given type of account management service. In this manner the pluggable account management interface 123 supports the unified login and logout with multiple authentication services 109.

The pluggable account management interface 123 is preferably a library of methods that the system entry services 107 invoke to obtain desired functionality from the various account management services. When called, the pluggable account management interface 123 determines selected ones of the account management services associated with a given system entry service 107, and invokes selected methods of these account management services, for example, to authenticate the user, initiate or terminate a session, or to and perform other account management operations. As a specific example, where the user is attempting to connect to the computer 101 through a login system entry service 107, the pluggable account management interface 123 dynamically determines which particular authentication service 109, account services 111, password services 113, and account services 115, if any, are to specifically used with the login system entry service 107, and invoke any method of such services as requested by the login system entry service 107. Since the pluggable account management interface 123 handles the determination and invocation of the account management services, both the user and system entry service 107 may interface transparently with any account management service, without the system entry service 107 having to be hardcoded to specific account-management service for providing the desired functionality.

The particular methods of the pluggable account management interface 123 are further discussed following a description of the configuration file 127.

Configuration File

In the preferred embodiment, the pluggable account management interface 123 determines the selected account management services associated with a given system entry service 107 through the configuration file 127. The configuration file 127 allows multiple different ones of a selected account management service type (account, session, password, or authentication) to be dynamically associated with a given system entry service 107. The ability to use multiple different ones of a given account management service is called "stacking," and it is particularly useful in conjunction with the authentication services. The configuration file 127 allows multiple authentication services 109 to be stacked for authenticating a user, and further enables unified login to such stacked authentication services 109 with a single password, and unified logout with a single logout command.

Generally, the configuration file 127 stores a set of service associations. Each service association relates one system entry service 107 with one or more selected account management services. The selected account management services may be of the same type, or from various types. The service associations form a decision table used by the pluggable account management interface 123 to determine which account management service is to be used provide account management functionality in response to the use of a particular system entry service 107.

In the preferred embodiment, each service association is a generally a tuple comprising the following information:

<system entry service name, account management service type, control flag, account management service path name, option parameters>

Table 1 illustrates an example of one set of possible service associations in a configuration file 127, and the description of the various elements of the service association tuple will refer to this example:

TABLE 1

| System Entry Service Name | Account Management Service Type | Control Flag | Account Management Service Path Name | Option Parameters |
| --- | --- | --- | --- | --- |
| login | authentication | required | /usr/lib/PAM/unix_auth.so.1 | |
| login | authentication | required | /usr/lib/PAM/unix_RSA.so.1 | use_map |
| login | session | required | /usr/lib/PAM/unix_session.so.1 | debug |
| login | account | required | /usr/lib/PAM/unix_account.so.1 | |
| ftp | authentication | required | /usr/lib/PAM/kerberos_auth.so.1 | |
| ftp | authentication | required | /usr/lib/PAM/rsa_auth.so.1 | use_default |
| ftp | session | optional | /usr/lib/PAM/unix_session.so.1 | |
| ftp | account | optional | /usr/lib/PAM/unix_account.so.1 | |
| * | password | required | /usr/lib/PAM/unix_password.so.1 | |
| * | authentication | optional | /usr/lib/PAM/diffie_auth.so.1 | |

The system entry service name field denotes one of the system entry services 107 available on the computer system 100, for example login, telnet, ftp, and the like, for which the service association is defined. In addition to individually specifying a single system entry service 107, a universal, or wild card, character, for example "*", may be used to indicate all system entry services 107. In the preferred embodiment, service associations that specify a particular system entry service 107 for a given type of account management service take precedence over associations that specify all system entry services 107 through a wild card. In the example of Table 1, the wild card in the last entry indicates that for all system entry services 107 other than those already specified, authentication is optional, and performed by an authentication service 109 providing Diffie-Hellman authentication. The wild card may also be used, in the preferred embodiment if all system entry services 107 have the same association to a given account management service. For example, the second to last entry indicates that all system entry services 107 use the password service 123 module provided in the UNIX® operating system to change the authentication token of the user.

The module type field indicates the type of account management service that is associated with the specified system entry service 107. The module type is preferably one of authentication, account, session, or password; but it may be any other type of account management service that is implemented on the computer 101. The module type designation is used at various stages of processing by the pluggable account management interface 123 to determine which account management service of a given type is to be invoked in response to a request by a system entry service 107. Generally, the pluggable account management interface 123 reads the configuration file to identify the service associations having a certain module type, and then queues the specified pathnames for invoking the specific services listed for that module type.

The account management service pathname field specifies the location of the account management service on the computer 101 or network 133. The pluggable account management interface 123 loads the specified service upon demand of the system entry service 107 to invoke the required function. For any given system entry service 107, multiple different account management service pathnames, and hence account management services of a given type, may be specified. This is stacking of account management services. In the preferred embodiment, when a system entry service 107 that is associated with stacked account management services requests an operation thereof, the pluggable account management interface 123 invokes the account management services in the order in which they are stored in the configuration file 127.

The control flag field determines the failure behavior of the associated account management service when that service is stacked with other services, and particularly indicates whether the service is required, or optional. Upon execution each account management service returns a value to the pluggable account management interface 123 indicating whether the account management service successfully executed. If an account management service returns a "failure" condition following its execution, the control flag field specifies whether the pluggable account management interface 123 should continue processing with other stacked account management services. If a required flag is specified, the failure status indicates that no further processing is attempted, and the connection attempt, or other processing, is aborted. If an optional flag is specified, the pluggable account management interface 123 invokes the next stacked, or unstacked account management service.

The control flag is usefully employed with multiple authentication services 109. In the example of Table 1, the user attempting to connect to the computer 101 via the login system entry service 107 must be authenticated by both the UNIX® system and by the RSA system. If either one fails, the user is denied access. If both are successful, the user is then optionally authenticated with a Diffie-Hellman authentication service 109, as determined by the last entry with the wild card. This authentication process is optional, and the user will still be allowed to connect to the computer 101 if it fails.

The option parameters is used by the pluggable account management interface to pass service specific options to each account management service. It is the responsiblity of the account management services themselves to interpret the option parameters. The debug parameter in the third service association, for example, turns on debugging in the specific service. The use_map and use_default parameters are used with authentication token mapping and unified login, described below.

Figure 2:
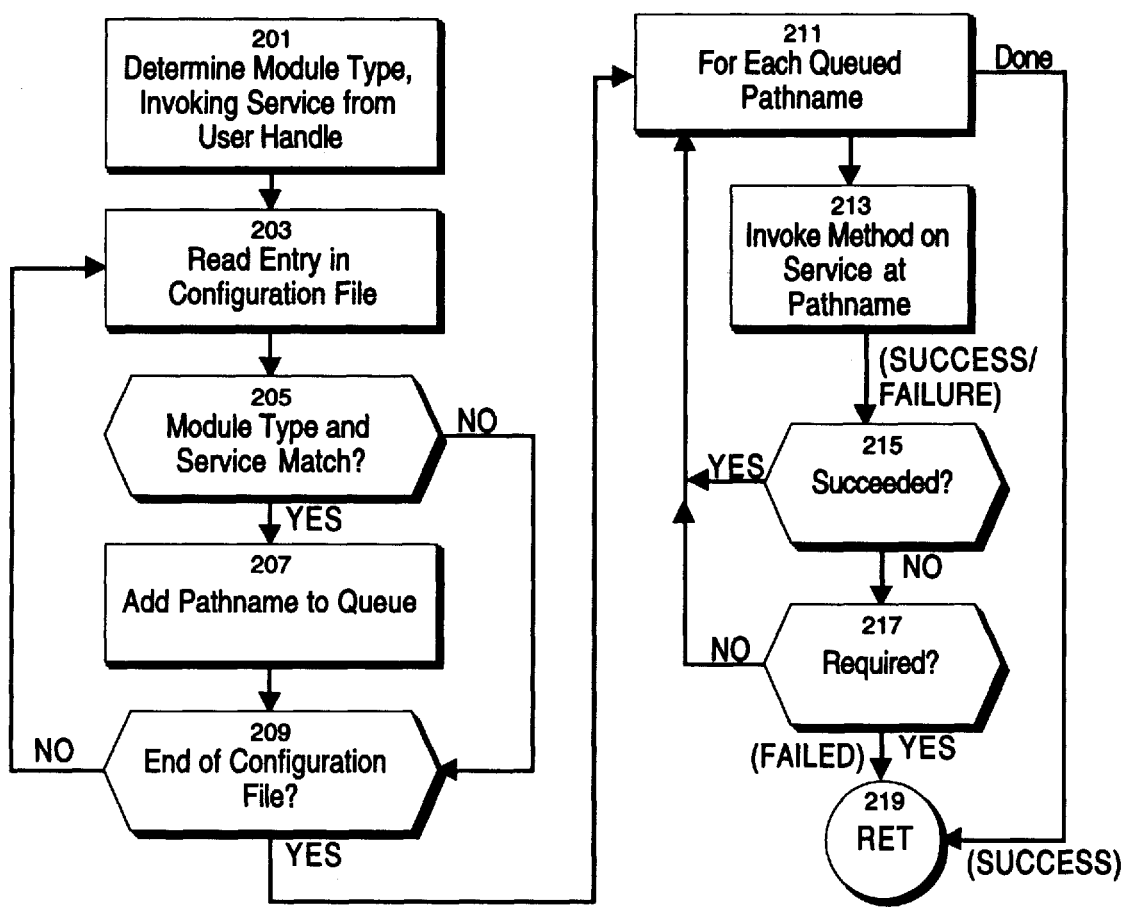
FIG. 2 is a flowchart of the operation of the pluggable account management interface in response to invocations for services via the configuration file.

Referring now to FIG. 2, there is a shown a flowchart of the operation of the pluggable account management interface 123 in handling the stacking of account management services. This logic is employed by as part of the main processing of the pluggable account management interface 123 prior to performing a specific method providing particular functionality to a system entry service 107. The pluggable account management interface 123 is invoked by system entry service 107, either in the course of connecting to the computer 101, or subsequently. The pluggable account management interface 123 determines 201 the type of system entry service 107 that is invoking it, and the module type of the account management service that the system entry service 107 is requesting. For example, the pluggable account management interface 123 determines that it is being invoked by the login system entry service 107, and that login is requesting an authentication service 109.

The pluggable account management interface 123 then reads 203 a service association entry in the configuration file 127. The pluggable account management interface 123 compares 205 the system entry service name in the service association to that of the invoking system entry service 107, and compares the module type specified in the service association to the requested module type. If there is a match, the pluggable account management interface 123 stores 207 the service pathname of the service association to a queue, along with the control flag included in the entry. The pluggable account management interface 123 considers a universal, or wild card, character a match. The pluggable account management interface 123 tests 209 whether the entire configuration file 127 has been read. If not, the pluggable account management interface 123 continues this processing until the entire configuration file 127 has been read. Using the example of Table 1 above, if the user was attempting to connect to the computer 101 with the login system entry service 107, and requesting a user authentication, then the pluggable account management interface 123 reads and queue the first two entries of the configuration file 127, /usr/lib/PAM/unix_auth.so.1, and /usr/lib/PAM/unix_RSA.so.1, along with the required control flags, since the system entry service name in the configuration file 127 matches login, and the module type matches authentication.

The pluggable account management interface 123 loops 211 over the queued pathnames for the account management services of the selected type. The pluggable account management interface 123 invokes 213 a specific method of a queued account management service, as determined from the input parameters, which define the type of operation the system entry service 107 is requesting. Continuing the above example, the pluggable account management interface 123 invokes an authenticate method on first the UNIX® authentication service 109, and then on the RSA authentication service 109. The account management service executes, and returns a value indicating whether the execution, here authentication, was successful.

The pluggable account management interface 123 determines 215 from the return value whether the service successfully executed. If so, the pluggable account management interface 123 invokes 213 the next account management service, if any. If the service did not execute successfully, the pluggable account management interface 123 determines 217 from the control flag whether the service is required. If the service is required, the pluggable account management interface 123 generally exits 219, or it may provide additional operations, depending on optional parameters passed to the pluggable account management interface 123 by the system entry service 107.

The ability to stack account management services is particularly useful when designating multiple authentication services 109. For example, in Table 1, the login system entry service 107 is associated with two authentication services, the UNIX® authentication service 109 provided by the UNIX® operating system, and an RSA authentication service 109. Each of these authentication services 109 is invoked 213 by the pluggable account management interface 123 to authenticate a user employing the login system entry service 107. If the UNIX authentication failed, the pluggable account management interface 123 determines 217 that such authentication service 109 is required per the configuration file 127. It then exits 219, and indicates to the system entry service 107 that authentication failed, and hence the user is not authorized to access the computer. The system entry service 107 may then inform the user of the failed authentication. If the UNIX authentication was successful, then the RSA authentication is invoked 213, and again tested for successful execution. Accordingly, the user is allowed to access the computer 101 only if authenticated by both of the services.

Authentication Token Mapping

In the preferred embodiment the stacking of multiple authentication services 109 is used in conjunction with an authentication token mapping technique to provide unified login. Authentication token mapping allows each stacked authentication service 109 to have a unique authentication token for the user, while requiring the user to remember or provide only a single authentication token when attempting to connect to the computer 101. The authentication token mapping process employs one authentication token of the user, the primary authentication token, to encrypt the user's other, secondary authentication tokens. The secondary authentication tokens are encrypted using any available encryption technique, which may be opaque between authentication services. The encrypted, or mapped authentication tokens are stored in some storage facility on the computer 101, such as a user context 141, naming service, user file, memory location, or the like. Alternatively, the encrypted authentication tokens may be stored in a smart card, or other non-public storage facility. The secondary authentication tokens are mapped because in whatever facility they are stored in encrypted form, the encrypted form is identified as being associated with a particular authentication service 109. In other words, the storage facility need only store the encrypted authentication token and data indicating to which authentication service 109 it belongs. The storage facility need not, and preferably should not, itself have the ability to decrypt the encrypted authentication tokens.

In other embodiments of the system 100, unified login is provided through using a same, single authentication token for all of the stacked, or selected authentication services. In order to support either approach in a single system 100, there is provided for the option parameter of the configuration file 127 two parameter values: use_default causes the specified authentication service 109 to use the primary authentication token, thereby resulting in a single token approach; use_map causes the authentication service 109 to obtain the encrypted secondary authentication token particular to it, and decrypt the secondary authentication with the primary authentication token.

Because the pluggable account management interface 123 reads the configuration file 127 to determine which account management service, and more particularly, which authentication service 109, to employ with a given system entry service 107, the association of one or more account management services with a given system entry service 107 may be flexibly configured without having to hardcode the association into the source code of the system entry services 107. The systems administrator may easily add new entries to the configuration file 127, to provide new services associations. Likewise, the system administrator may change existing service associations, for example, to upgrade an existing authentication service 109 with a new revision, or to change from one authentication service 109 to another entirely. All this may be done without disrupting the users' ability to access the system 100, and without the need to perform programming, thereby increasing the ease of maintenance and the flexibility of the system 100. Further, because the pluggable account management interface 123 dynamically determines the correct account management service for a given invocation by a system entry service 107, the pluggable account management interface 123 and configuration file 127 allow the account management services to be accessed transparently to the user.

The combination of authentication token mapping and stacking of authentication services 109 via the configuration file 127 provides a powerful, and flexible authentication system. However, authentication token mapping may be used independently of the configuration file 127 and service associations therein, such as with more conventional hard-coded relationships between system entry services 107 and authentication services 109. A process of authentication token mapping is more fully described with respect to FIG. 4, below in the context of the process of connecting to the computer 101.

Finally, the configuration file 127 is only one means of establishing the service associations between the system entry service 107 and the account management services. In other embodiments, other storage facilities, such as a naming service operating in conjunction with the XFN API specified in "Federated Naming: The XFN Specifications", X/Open Preliminary Specification, X/Open Document #P403, ISBN:1-85912-045-8, X/Open Co. Ltd., July 1994, may be used, for example.

Methods of the Pluggable Account Management Interface

Having described the interaction between the pluggable account management interface 123 and configuration file 127 to provide transparent access to the account management services, and stacking of services, the specifics of the pluggable account management interface 123 methods are now be described. These are the methods that are invoked on the pluggable account management interface 123 by the system entry services 107 to obtain specific functionality from the underlying account management services. The pluggable account management interface 123 then invokes (213) corresponding methods on the particular account management services specified in the configuration file 127.

The pluggable account management interface 123 preferably provides five general categories of methods that interface with the various account management services through the configuration file 127. A first category provides methods that initiate, maintain, and terminate an service transaction for a user through the use of a user handle. A second category contains methods that interface with the authentication services 109 to authenticate a user, get and set a user's credentials, and destroy a user's credentials upon termination of a session. A third category contains methods that interface with the session services to initiate the opening and closing of sessions. A fourth category contains a method that interfaces with the password services to change the authentication token. A fifth category contains functions that interface with the account services to get and set attributes of the authentication token.

Service Transactions

The first category of interfaces of the pluggable account management interface 123 provide for the initiation, maintenance, and termination of a service transaction. A service transaction is defined by the set of operations, or behaviors that a user or system entry service 107 invokes to obtain a desired result, such as authenticating a user, updating the user's account, changing an authentication token, and the like. A service transaction may require only a single function of a single account management service, or multiple functions of the same or different account management services. These interfaces assist in transparently passing system entry service specific information through the pluggable account management interface 123 to the underlying account management services, thereby eliminating the need to hard code into each system entry service the interfaces of the account management services.

A service transaction is initiated by a start transaction method which creates a user handle. The start transaction method takes as inputs the name of the current system entry service 107, the user's name, and a variable for holding the user handle. Upon successful completion, the user handle stores the passed-in information, so that it may be subsequently passed to specific methods of the account management services.

Because the invention allows any system entry service 107 to be associated with any individual or number of various account management services, it is understood that each system entry service 107 provides it own specific routines to display information to the user, and to obtain user inputs. Since the operation of the underlying account management services is preferably transparent to the user, it is desirable that a given system entry service 107 manage the interaction with the user. Accordingly, in the preferred embodiment, the start transaction method obtains from a system entry service 107 the address of a set of functions of that system entry service 107 that may be invoked by any of the account management services to display information and obtain input from the user. These functions are collectively referred to as conversation functions, since they manage a dialogue with the user. A given account management service may invoke the conversation functions through their address when necessary to interact with the user. Thus, the address of the conversation functions is also passed in and stored in the user handle. Finally, in some embodiments, such as a UNIX® environment, there is also passed into the start transaction method, and stored in the user handle the tty or port name, and remote host name, where the user is connecting from a remote computer system.

The preferred embodiment further provides methods that get and set specific items in the user handle. The set item method is preferably passed a pointer to an item, such as user_name, and an item type flag. The method copies the item to the portion of the user handle specified by the item type flag. Similarly, the get item method is passed a pointer, and item type flag. This method assigns to the pointer the address of the object having the specified item type.

Finally, there is provided an end transaction method in the pluggable account management interface 123. This method is invoked by the pluggable account management interface 123 to terminate a service transaction employing a given user handle, and to free any storage allocated by a account management service to manage the user handle.

For the functionality provided by the methods in the second through fifth categories, those that interface with the account management services directly, the pluggable account management interface 123 preferably first performs the main processing described above with respect to FIG. 2. The particular processing of each of the methods is then employed where the pluggable account management interface 123 invokes 213 the particular method of the account management services of the proper module type, and associated with the current system entry service 107. Accordingly, in the descriptions of the second through fifth categories that follow, it assumed that the pluggable account management interface 123 has determined which account management service, and pathname is being invoked by the system entry service 107.

Authentication Interfaces

In the second category, the pluggable account management interface 123 provides methods to manage authentication of the user. First, there is provided an authenticate user method. This method manages the authentication of a user with any number of authentication services, as determined by the service associations in the configuration file 127.

The authenticate user method is passed the user handle, and preferrably, an authentication token. Where the user is connecting through remote computer, the authenticate user method tests the name or address of the remote computer against a list of trusted remote computers. Where the remote computer is trusted, the user has already been authenticated, and no further local authentication is needed. If not the remote computer is not a trusted source, the user's handle and authentication token is then passed to the selected authentication services.

The authenticate user method may additionally taken a number of input parameters specifying the processing of the authentication token. A validate authentication token flag causes the authenticate user method to determine if the user's authentication token has expired in those systems that age the authentication token. This is done by preferably invoking the get authentication attributes method of the applicable account service, and comparing the specified information with current date, time, or other system data. A continue authentication flag when set causes the authentication procedure to continue even if the authenticate user method of an authentication service 109 detected an error that would otherwise cause the authentication to fail. This flag provides a useful security feature that hides the authentication behavior from an unauthorized user by not informing such a user of the cause of the authentication failure, such as non-valid user name, or incorrect authentication token.

The authenticate user method preferably provides a return value indicating the status of the authentication. The return value indicates at least whether the authentication was successful or not, and may further indicate for unsuccessful attempts whether a predetermined maximum number of authentication attempts was exceeded, whether no valid (un-expired) account is present on the system for the user, or whether the authentication token has expired.

The pluggable account management interface 123 further includes in this first category a method that creates or sets the user's credentials. In the UNIX® environment, this method employs the underlying setuid and setgid functions of the operating system. In a Kerberos based environment, after authentication, the credential is a ticket for accessing a ticket granting service. The ticket includes the user id and group id information in encrypted form. The set credentials method allows the user to initialize and define a supplementary group access list, to set real or effective group id, and to set real or effective user id. A complementary get method retrieves these various values. The credentials are stored in a user context 141 or other facility. For other types of authentication services 109 the credentials are created consistent with the authentication framework of the authentication service 109.

The pluggable account management interface 123 also includes in this category a destroy credentials method. This method is invoked by the pluggable account management interface 123 when the user terminates a session or logs out of the system 100. The destroy credentials method invokes on the selected authentication services 109 used to authenticate the user their underlying destroy credentials methods.

Session Interfaces

In the third category, the pluggable account management interface 123 includes a open session method, and a close session method. The open session method generally initiates an open session method of the session service associated with a given system entry service 107. The open session method controls the behavior of the underlying open session method by specifying how the user record file is to be handled for either updating an existing entry if available, otherwise exiting, or creating a new entry for the session.

A close current session similarly updates the user record, either updating an existing record, or deleting it.

Password Interfaces

In this fourth category, the pluggable account management interface 123 provide a change authentication token method. This method preferably passes a current authentication token, user handle, and conversation function to a selected password service 113 associated with the current system enter service 107, as determined from the configuration file 127. The password service 113, as further described below, manages the actual authentication and replacement of the authentication token.

Account Interfaces

In this fifth category of interfaces there is provided methods that determine and update various account validation attributes of a user account. Account validation attributes include account and authentication token aging data, including minimum and maximum number of valid days for the account and authentication token, valid session hours, authentication token modality of the authentication token, that is, whether an authentication token is required for the user to access the system, directory or service access restrictions, and the like. The validate account method is passed the user handle and obtains access to the user account validation attributes data therefrom. The validate account method then determines whether the account has expired, whether the user's authentication token has expired, whether the current session is during valid session hours for the user, whether the user's requires authentication, and so forth. The validate account method passes back a return value indicating whether the user's acccount is valid with respect to the tracked parameters.

There is also provided in this category methods to get and set specific account validation attributes for the account. The user, or system administrator as appropriate, may set or get the account or authentication token expiration and aging information, the access hours, the modality of the authentication token, and the like. These methods invoke underlying similar methods of an account service 111 that perform the actual getting and setting of the account validation attributes.

Account Management Services

The account management services include the set of services associated with establishing and maintaining a user account on the computer 101. These services include the authentication, session, password, and account services. In the preferred embodiment, each account management services includes methods that provide functionality supporting each of the methods of the pluggable account management interface 123. For example, each authentication services 109 includes methods that provide to the pluggable account management interface 123 the authentication of a user, and creation and destruction of credentials. In the preferred embodiment, the names and interfaces of these are essentially the same as the interfaces to the methods of the pluggable account management interface 123. For example, there is an authenticate method of the pluggable account management interface 123, and an authenticate method of each authentication service, for which the function prototypes are the same, and the names vary only by a prefix indicating whether the interface is for the pluggable account management interface 123 or for an authentication service 109. This simplifies the organization of the pluggable account management interface 123, and the understandability of the interfaces. Accordingly, in the description that follows, the method names are referred to by the same designation.

Authentication Services

The computer 101 includes one or more authentication services 109. The authentication services 109 provide different types of authentication schemes for establishing and verifying an identity of a user 105 attempting to access the computer 101. The authentication services 109 may include password or encrypted key based mechanisms such as Diffie-Hellman, DES, Kerberos, RSA, and the like; biometric mechanisms; hardware/firmware based mechanisms, such as smart-card, and the like, or challenge/response systems, such as securID, or Enigma.

Each authentication service 109 includes an authenticate method, a create credentials method, and a destroy credentials method. The authenticate method performs the particular type of authentication associated with the authentication service 109. For example, the authenticate method may request and verify a user's password, request a response to a challenged prompt, decrypt an input key, read, through the appropriate hardware devices, biometric data (such as retina scan or voiceprint) of the user and verify such data.

The authenticate method takes as an input parameter a user handle and the authentication token. The authentication token may be provided by the user, or it may be passed to the authenticate method by the pluggable account management interface 123 after being obtained from a user context 141 where there are multiple authentication services 109 being used to authenticate a user. This process provides for a unified login wherein the user provides a primary authentication token to the pluggable account management interface 123, and the pluggable account management interface 123 handles the access and forwarding of the encrypted secondary authentication tokens to their respective authentication services 109.

The create credentials method creates and stores user's credentials. Credentials are typically user and session specific values that establish the user's identity. The create credentials method preferably takes as an input the user's handle, and data used to create the credentials, such as the user's id, the group id, or the like. The credentials may be stored in any appropriate facility or resource, such as the addressable memory 103, a system user's file, or the like, depending on the type of authentication service 109 being used. Depending on the authentication service, the create credentials method may be part of the authenticate method (as in UNIX where setuid and setgid opertions are performed in conjunction with authentication), or separate, as in a Kerberos authentication service, where tickets are granted separately from user authentication.

Each authentication service 109 further includes a destroy credentials method. This method locates the credentials of a selected user and remove, or destroy them, from whatever facility or resource is storing them.

Password Services

The system 100 further includes at least one password service 113. Each password service 113 manages the authentication tokens of authorized users of the system 100. Here, the password services 113 provide the actual functionality specific to the authentication environment for changing the authentication token of the user. Thus, each password service 113 provides a change authentication method that complies with the interface of the pluggable account management interface 123, to accept a user handle, authentication token, and conversation function. The password service 113 uses the conversation function to obtain a new authentication token from the user, and update it accordingly.

Session Services

The system 100 further includes at least one session service 115. Each session service 115 manages the particular instances of an authorized user connecting to and using the system 100. In the preferred embodiment, each session service 115 provides an open session method and a close session method. The open session method initiates a session for the user on the computer system 100, recording when and where the user logged in. This data is preferably stored in a user record file, such as wtmp, utmp in UNIX®, that other services may query to determine which users are present. The close session terminates the user's session, and updates the system 100 to indicate when the user logged out, and clears the entries in the user records.

Account Services

The system 100 further includes at least one account service 111. Each account service 111 includes methods that set and get account validation attributes, including authentication token aging information, such as when the authentication token expires, the maximum and minimum number of valid days, and the like; access hours restrictions for the user's account; account expiration date; and account service restrictions, such as what directories, file, resource, or services the user is authorized to access. Each account service 111 maintains these account validation attributes for each user's account, and provides methods to get and set this data on a per user basis.

System Operation

Figure 3:
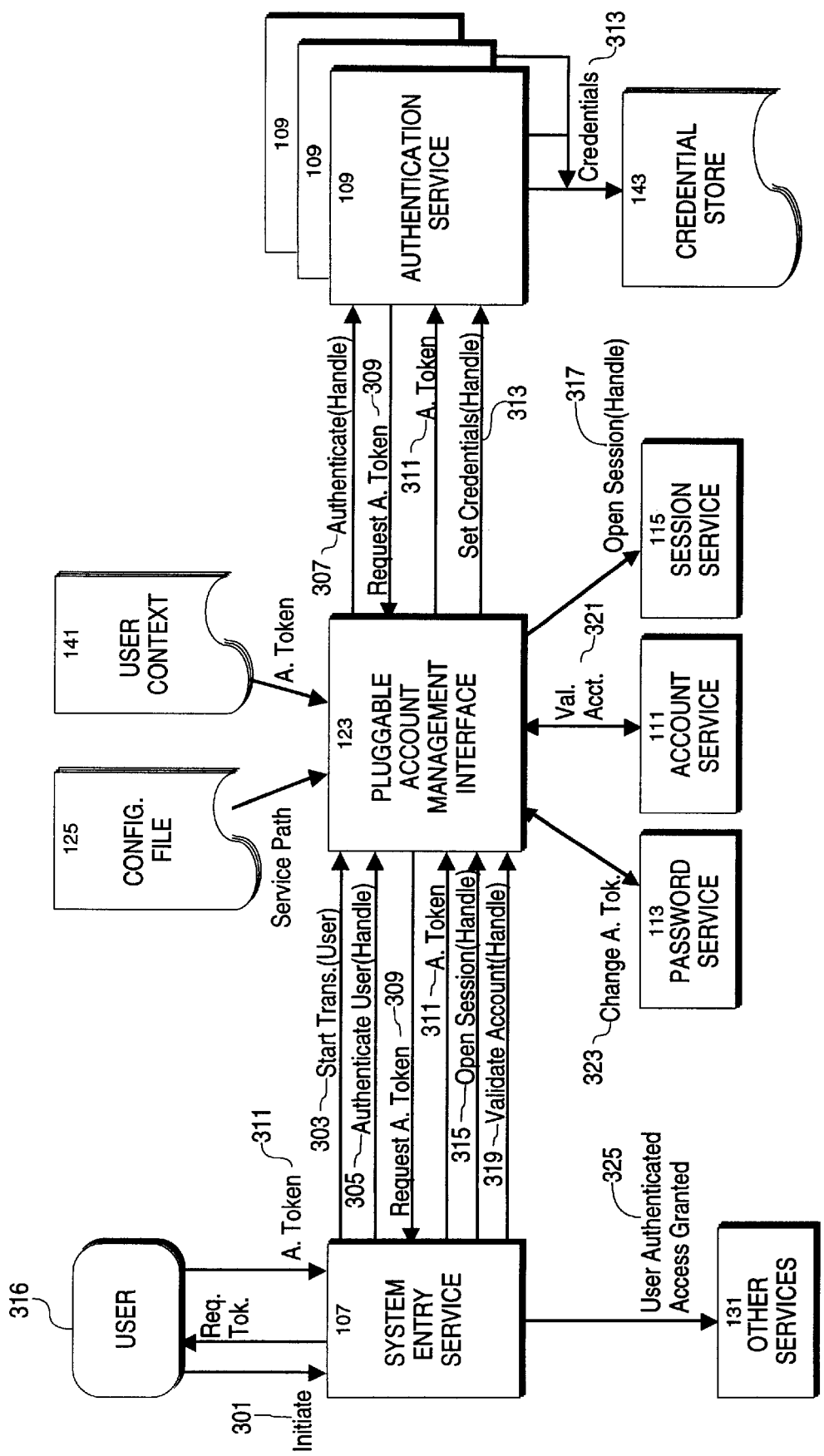
FIG. 3 is a dataflow diagram illustrating the process of connecting to the computer system with a unified login.

Referring now to FIG. 3, there is shown a data flow diagram of the operation of the pluggable account management interface 123 in conjunction with the system entry services 107, account management services, and configuration file 127 during connection of a user to the system 100. The user initiates 301 a session on the computer 101 by invoking a selected system entry service 107, such login, ftp, or the like. The system entry service 107 invokes its underlying connect method, passing the necessary connection information, handshakes, to the computer 101 to establish a physical connection between the user's terminal or computer and the computer 101. The system entry service 107 then invokes 303 the start transaction method of the pluggable account management interface 123, passing in the user's name, computer name, and the like, as described above. The pluggable account management interface 123 creates a handle for the user from this information.

The system entry service 107 invokes 305 the authenticate user method of the pluggable account management interface 123, passing in the user's handle. The pluggable account management interface 123 performs the general processing as described above with respect to FIG. 2 to determine which authentication services 109 are associated with the current system entry service 107, and to queue the pathnames of these services. The multiple authentication services 109 are illustrated in the figure. This process is used in support of the unified login, since the selected authentication services 109 have been determined transparently to the user. The authenticate user method in turn invokes 307 the authenticate method of each authentication service 109 that is identified in the configuration file 127. In the preferred embodiment, the pluggable account management interface 123 passes in the user handle, an authentication token, and the conversation function address for the system entry service 107. The authenticate method of each selected authentication service 109 authenticates the user, either through direct prompting 309 via the conversation functions and analysis of the user's response, or through analysis of the authentication token passed into the authenticate method. If requested, the user provides 311 an authentication token, such as a password, biometric data, smart card, or the like. In either case, the authenticate method then authenticates the user's authentication token.

Figure 4:
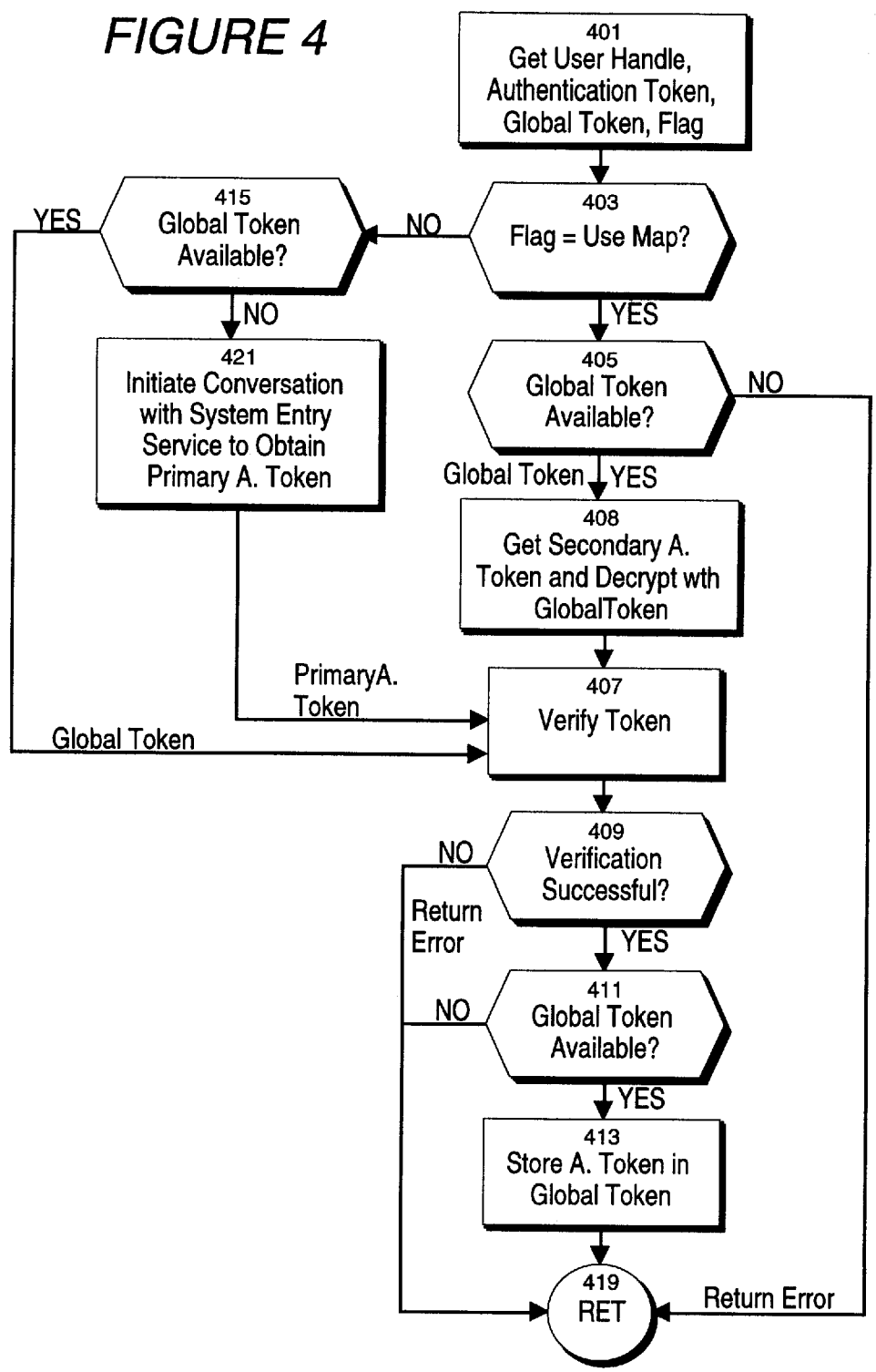
FIG. 4 is a flowchart of the process of handling multiple authentication services for providing unified login through authentication token mapping.

Unified login for the multiple authentication services 109 is provided by authentication token mapping. Referring now to FIG. 4, there is shown a flowchart of one embodiment of handling the authentication token mapping in each of the authentication services 109. An authentication service 109 is invoked 401 by the pluggable account management interface 123 through its authenticate method, with the pluggable account management interface 123 passing in the user handle, an authentication token, if any, control flags, as specified, and a variable holding a global token, if any. The global token is used to pass a primary authentication token between the selected authentication services 109, particularly, between a primary authentication service 109, the first authentication service 109 listed in the configuration file 127 or similar database, and the secondary authentication services 109. The authentication service 109 then determines 403 whether the option parameter is set to use__map indicating the authentication token mapping is being used all authentication services 109.

If so, the authentication service 109 determines 405 whether the global token is available, that is non-null. The global token is unavailable if the user did not pass in an authentication token when connecting. If the global authentication token is not available, then there is an error because there is no authentication token with which to perform the authentication token mapping. Accordingly, the authentication service 109 exits 419, and returns an error.

If however, global token is available, it means that the current authentication service 109 is a secondary authentication service being called to authenticate the user. This secondary authentication service 109 obtains 408 an encrypted secondary authentication token associated with the service 109. This may be done by requesting the pluggable account management interface 123 to obtain the encrypted secondary authentication token. The pluggable account management interface 123 obtains the appropriate secondary authentication token for the requesting secondary authentication service 109 from either the user context 141 (or alternatively, a naming service, directory, smart card or any other storage facility), and passes it back to the secondary authentication service 109, which then decrypts it.

The authentication service 109 verifies 407 the token, whether it is a global token, primary authentication token, or secondary authentication token, depending on whether the authentication service 109 is the primary authentication service, and whether authentication token mapping is being used.

The authentication service 109 tests 409 whether the verification was successful. If the verification was successful and the user authenticated, the authentication service 109 further determines 411 whether the global token is empty. For a first, or primary authentication service 109 authenticating the user, the global token will be empty. Accordingly, the authentication service 109 stores 413 the primary authentication token to the global token, and exits 419, returning a return value indicating that the authentication was successful.

If the authentication failed, the authentication service 109 exits 419, and returns a value indicating failure. The pluggable account management interface 123 may then proceed as programmed, as shown in FIG. 2, above. This process may be repeated for each selected authentication service 109 that is stacked in the configuration file 127.

If the authentication service 109 determines 403 that the flag is set to use__default, then this means that authentication token mapping is not being used for that particular authentication service 109, but the authentication service 109 is to use the global or primary authentication token. The authentication service 109 determines 415 whether the global token is available. Again, the global token will be available if passed-in by the user. If the global token is avaiable, then it is used to verify 407 the user, the authentication service 109 proceeding as described above. At step 411 the global token is available, so the step of storing 413 is bypassed.

If however, the global token is not available for use as a default authentication token, the authentication service 109 initiates 421 a conversation with the system entry service 107, via the conversation function address, in order to obtain a primary authentication token from the user. The user passes in the primary authentication token (as described above). Again, the authentication service 109 verifies 407 the user, now using the primary authentication token, and stores 413 this primary authentication token to the global token. For any subsequent secondary authentication service 109 that is invoked, and for which the use_map flag is set, such secondary authentication service 109 uses the global token to decrypt 408 a particular secondary authentication token.

If the authentication process is successful by the selected authentication services 109, the system entry service 107 is granted access to the computer 101. Otherwise, the pluggable account management interface 123 continues processing, or exits depending on whether the authentication was required, or optional, as described above.

Where access is granted, the user's credentials are created. This may be done through a direct invocation 313 by the pluggable account management interface 123 on its set credentials method, or it may be done implicitly by the authentication service 109 when the user is authenticated. The created credentials are stored in the credential store 143, or other storage facility. The system entry service 107 invokes 315 an open session method of the pluggable account management interface 123 in order to initiate a new session for the user. Again, the pluggable account management interface 123 determines from the configuration file 127 the appropriate session service for the current system entry service, and invokes 317 its open session method. The open session method updates the user record as described, and performs other useful session management functions.

The system entry service 107 may then validate 319 the user's account through the validate account method of the pluggable account management interface 123, passing in the user handle. Here too, the pluggable account management interface 123 determines the selected account service from the configuration file 127, and invokes 321 validate account method of such service to determine whether the user's account has expired, whether a new password is needed, and the like.

If the user's password has expired, then the pluggable account management interface 123 determines the selected password service for the current system entry service 107, and invokes 323 the change authentication token of such password service. The password service 113 in turn requests the user to provide the current and a new authentication token, using the conversation functions of the system entry service 107.

Finally, after the user has been authenticated, a session opened, and the user's account validated, the user is granted 325 access to the other services available on the computer system 100.

Figure 5:
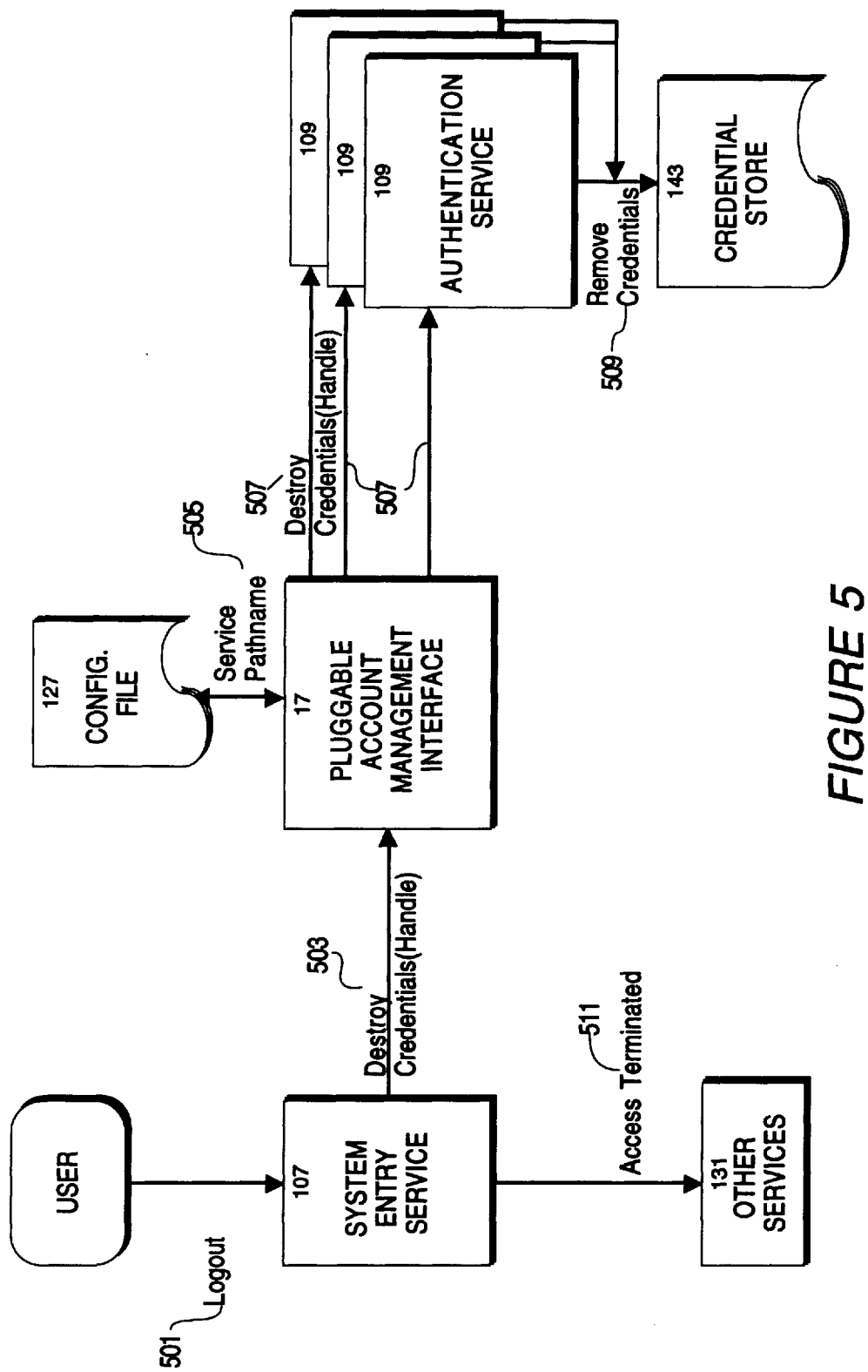
FIG. 5 is a dataflow diagram illustrating the process of disconnecting from the computer system during a unified logout.

Referring now to FIG. 5, there is shown a dataflow diagram of the process of disconnecting from the computer 101, and providing unified logout. The unified logout process ensures that the user's authentication token and credentials are removed from any publicly accessible resource, and thus cannot be fraudulently obtained or used after the user has terminated a session. Referring to the figure, the user logouts 501 of the system entry service 107, either explicitly by invoking a specific method of the system entry service 107, or implicitly by shutting off the workstation or terminal the user is working on. In either case, the system entry service 107 initiates a disconnect process, and handles the necessary physical disconnection and protocols for disconnecting from the system 100. As a part of the disconnect process the system entry service 107 invokes 503 the destroy credentials method of the pluggable account management interface 123, passing in the user handle.

The pluggable account management interface 123 determines 505 from the configuration file 127 the selected authentication services 109, and invokes 507 on each of them a destroy credentials method, passing in the user handle. Each of these authentication services 109 perform their appropriate destroy credentials methods, locating and removing 509 the user's credentials and authentication tokens from whatever credential storage 143 or other facility in which they may be stored. The user's access to the other services 123 on the system 100 is terminated 513. In an alternate embodiment, a separate account management service may be provided in addressable memory 103 for each authentication service 109 that provides the destroy credentials method, and is thereby invoked by the pluggable account management interface 123 in response to the system entry service's 109 request to destroy credentials. In either case, the configuration file 127 is used to stack the appropriate service and pathname in association with the system entry service 107. This allows the pluggable account management interface 123 to transparently provide the unified logout process. As a result, the user can logout of the system as easily and simply as she logged in, without any need to directly interact with the underlying authentication services 109.

Referring again to FIG. 5, each selected authentication service 109 accesses the user's credentials and authentication tokens in whatever facility they are stored, and removes 509 them. This prevents unauthorized users from obtaining the credentials. Since the pluggable account management interface 123 handles the invocation cycle on each of the selected authentication services, the user does not have to manually invoke the destroy credentials method on each, thereby providing significant ease of use to the user, and a transparent, yet secure logout process. An end transaction method may be used to deallocate any storage that the pluggable account management interface 123 allocated to any of the selected account management services, making such storage available to other processes on the system 100.

Figure 6:
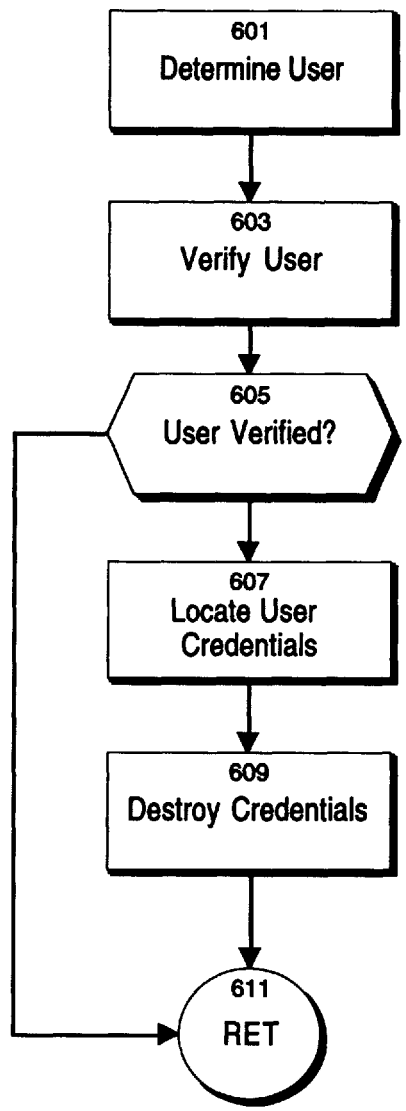
FIG. 6 is a flowchart of a process of handling multiple authentication services for unified logout with multiple credentials.

Referring now to FIG. 6, there is shown a flowchart for logic of the destroy credentials method of an authentication service 109. This method is preferably provided as a part of each authentication service 109, and is performed by the service when invoked either by the system entry service 107 during logout, or by the user directly.

The authentication service 109 determines 601 the user for whom the destroy credentials is being called. The user is preferably determined from the user handle, passed in by the calling function, or in some cases, the authentication service 109 may initiate a conversation via the calling service's conversation function to obtain directly the user name, and related information.

The authentication service 109 then verifies 603 the user to prevent another, unauthorized user from invoking the destroy credentials function and destroying the keys of legitimate user. Verification may be done either as a re-authentication, using a passed in authentication token, or a challenge/response conversation via the conversation function address, and the authenticate user method. Alternatively, the authentication service 109 may obtain the user id of the user for whom the credentials are being destroyed from the user handle, and compare this with the user id of the user calling the function, obtaining this latter user id from the operating system 133.

The authentication service 109 determines 605 whether the user was verified. If not, a unauthorized user is attempting to logout a legitimate user, and so the authentication service 109 exits 611. If the verification was successful, the authentication service 109 locates 607 the user's credentials and authentication tokens. The authentication service 109 either itself maintains information on where the credentials of each user are stored, or it employs the operating system 133 to obtain the credentials. As stated above, the credentials and authentication tokens may be stored in a user context 141, a naming service, directory, a file, daemon, smart card, or even in memory, according to the machine specific implementation of the authentication service 109.

The authentication service 109 destroys 609 the user's credentials and authentication tokens, if any, that are stored for the current session. Destroying the credentials may involve invoking a daemon, for example, to remove the credentials from their storage facility. The authentication service 109 then exits 611, returning to the pluggable account management interface 123. The pluggable account management interface 123 then invokes each remaining selected authentication service 109 (or specific account management service for destroying credentials) to complete the unified logout.

We claim:

1. A computer system providing multiple account management services to a user connecting to the computer system with a first system entry service, comprising:

at least one system entry service, each system entry service providing a method to connect a user to the computer system during a session;

at least one account management service comprising a plurality of operations for managing user specific account data for users of the computer system;

a storage facility having a plurality of services associations, each service association identifying a system entry service and at least one account management service; and, an application programming interface mediating between the system entry services and the account management services, the application programming interface providing a plurality of API methods, each API method invoking at least one operation of at least one selected account management service in response to an invocation of the application programming interface to provide the operation, the application programming interface determining from the storage facility the at least one selected account management service associated with a selected system entry service used to connect the user to the computer system.

2. The computer system of claim 1, wherein in each service association the account management service is identified by an account management type and by a pathname specifying a storage location of the account management service.

3. The computer system of claim 2, each service association further comprising a control flag specifying whether the API method invoking the account management service identified in the service association continues executing following a failure of an invoked operation of the account management service.

4. The computer system of claim 1, further comprising:

a plurality of authentication services included in the account management services, each authentication associated with at least one system entry service in a service association in the storage facility, and providing a first method that authenticates a user from data identifying the user and an authentication token; and the application programming interface having at least one method that identifies at least one selected authentication service associated with the selected system entry service, and invokes the first method of each selected authentication service.

5. The computer system of claim 4, wherein:

each authentication service further comprises:
      a second method that creates credentials for an authenticated user, and stores the credentials;
      a third method that destroys the credentials;

the application programming interface having at least one method that determines at least one selected authentication service associated with the selected system entry service, and invokes the third method of each selected authentication service in response to a user terminating operation of the selected system entry service.

6. The computer system of claim 4, where the user is connecting to the computer system from a remote computer, the application programming interface determines whether the remote computer is a trusted computer known to have previously authenticated the user, and only in response to the remote computer not being a trusted computer invokes the first method of each selected authentication service to authenticate the user.

7. The computer system of claim 1, further comprising:

at least one session service included in the account management services, each session associated with at least one system entry service in a service association in the storage facility, and providing a first session method that opens a session for a user of the computer system; and, the application programming interface having at least one method that identifies at least one selected session services associated with the selected system entry service, and invokes the first session method of each selected session service.

8. The computer system of claim 7, wherein:

each session service further comprises a second session method that closes a session of the user on the computer system; and the application programming interface having at least one method that identifies at least one selected session service associated with the selected system entry service, and invokes the second session method of each selected session service in response to a user terminating operation of the selected system entry service.

9. The computer system of claim 1, further comprising:

at least one account service included in the account management services, each account service associated with at least one system entry service in a service association in the storage facility, and maintaining account validation attributes for an account of a user; and, the application programming interface having at least one method that identifies a selected account service associated with the selected system entry service, and determines from the selected account service whether the user's account is valid from the account validation attributes in response to the user connecting to the computer system with the selected system entry service.

10. The computer system of claim 9, wherein:

each account service further comprises a first account method that determines selected account validation attributes; and the application programming interface having at least one method that identifies the selected account service associated with the selected system entry service, and invokes the first account method of the selected account service in response to a user request to determine the selected account validation attributes.

11. The computer system of claim 1, further comprising:

at least one password service included in the account management services, each password service associated with at least one system entry service in a service association in the storage facility, and having a first password method that updates a current authentication token of the user to a new authentication token; and, the application programming interface having at least one method that identifies at least one selected password service associated with the selected system entry service, and invokes the first password method of each selected password service in response to the current authentication token of the user being expired.

12. The computer system of claim 1, wherein the API methods of the application programming interface further comprise:

a start transaction method that initiates a transaction and creates a user handle in response to data identifying the selected system entry service and the user's name;

a set user handle method that updates selected data items in the user handle; and an end transaction method that terminates a transaction for a selected user handle.

13. A computer system providing unified login through a plurality of authentication services with a single primary authentication token, comprising:

a plurality of authentication services each authentication providing a first method that authenticates a user from data identifying the user and an authentication token; and a first storage facility storing a plurality of authentication token mappings, each authentication token mapping including a primary authentication token, and at least one secondary authentication token encrypted with the primary authentication token, and data specifying a secondary authentication service associated with the secondary authentication token;

a system entry service connecting a user to the computer system during a session and associated with a plurality of authentication services, one of the plurality of authentication services being a primary authentication service, and at least one of the plurality of authentication services being a secondary authentication service;

an application programming interface having at least a first method that:

determines the primary authentication service associated with the system entry service, and each secondary authentication service associated with the system entry service;

invokes the first method of the primary authentication service, the first method of the primary authentication service authenticating the user with a primary authentication service obtained from a user; and, invokes the first method of each secondary authentication service, the first method of each secondary authentication service obtaining from the first storage facility a secondary authentication token associated with the secondary authentication service, decrypting it with the primary authentication, and authenticating the user with the decrypted secondary authentication token.

14. The computer system of claim 13, further comprising:

for each secondary authentication service a parameter value that indicates use of either encrypted secondary authentication tokens, or a primary authentication token; and, each secondary authentication service determines the parameter value, and responsive to the parameter value indicating use of a primary authentication token, authenticates the user with the primary authentication token.

15. A method for providing multiple account management services, each account management service providing account management methods, to a user of a computer system, comprising the steps of:

storing in a computer readable storage facility a plurality of associations between selected system entry services and selected account management services;

connecting the user with a first system entry service to the computer system;

determining from the storage facility a first account management service associated with the first system entry service;

selectively invoking methods of the first account management services in response to requests by the first system entry service or the user for selected account management methods.

16. The method of claim 15, wherein the step of storing in a computer readable storage facility further comprises the step of:

storing associations between selected ones of the system entry services and selected authentication services, each selected authentication service providing a method for authenticating a user.

17. The method of claim 16, further comprising the steps of:

in response to connecting the user to the computer system, performing the steps of:

identifying from the storage facility selected authentication services associated with the first system entry service; and invoking each selected authentication service to authenticate the user.

18. The method of claim 17, further comprising the steps of:

determining whether a first selected authentication service successfully authenticated the user; and responsive to a first selected authentication service not successfully authenticating a user, invoking a second selected authentication service to authenticate the user.

19. The method of claim 17, further comprising the steps of:

determining whether a first selected authentication service successfully authenticated the user;

responsive to a first selected authentication service not successfully authenticating a user, indicating to the first system entry service that the user was not successfully authenticated; and disconnecting the user from the computer system.

20. The method of claim 16, further comprising the steps of:
   for each selected authentication service, creating a user credential of a first user, and storing the user credential;
   responsive to a request by a second user to terminate the first system entry service, performing the steps of:
      determining whether the second user is the first user;
      responsive to the second user being the first user, for each selected authentication service, destroying the user credential.

21. The method of claim 15, wherein the step of selectively invoking methods of the account management services, further comprises the steps of:
   determining whether an invoked method a first account management service executed successfully;
   responsive to an invoked method of a first account management service executing successfully, invoking a method of a second account management service;
   responsive to the invoked method of the first account management service not executing successfully, determining whether the first account management service is required; and
   responsive to the first management service not being required, invoking a method of a second account management service.

22. A method of providing unified login to multiple authentication services on a computer system, comprising the steps of:
   storing in a computer readable facility a primary authentication token associated with a primary authentication service, and at least one secondary authentication token encrypted with the primary authentication token and associated with a secondary authentication service;
   authenticating a user with the primary authentication token;
   determining whether the user was successfully authenticated;
   responsive to the user being successfully authenticated, for each secondary authentication service, performing the steps of:
      retrieving a secondary authentication token associated with the secondary authentication service from the storage facility;
      decrypting the secondary authentication token with the primary authentication token; and
      authenticating the user with the secondary authentication token.

23. A computer operable mechanism for controlling the operation of a computer system, comprising:
   a computer readable memory;
   an application programming interface stored on the computer readable memory, having a plurality of methods, each method executable by the computer system and providing an interface to an operation of a selected account management service, the selected account management service dynamically determined by the application programming interface from among a plurality of stored associations in response to an invocation of the interface of the method, each association identifying a system entry service and an account management service of a predetermined type.

24. A computer system providing unified logout to multiple authentication services for a user, comprising:
   at least one system entry service, each system entry service providing a method to connect a user to the computer system during a session;
   a plurality of authentication services, each authentication service associated with at least one system entry service in a service association in a storage facility, and providing a first method that creates a user's credentials, and a second method that destroys the user's credentials;
   a storage facility having a plurality of services associations, each service association identifying a system entry service and at least one authentication service; and,
   an application programming interface mediating between the system entry services and the authentication services, the application programming interface having at least one method that invokes, in response to a user connecting to the system with a selected system entry service, the first method of each selected authentication service associated with the selected system entry service; and further invokes, in response to a user terminating operation of the selected system entry service, the second method of each selected authentication service.

25. The computer system of claim 1, wherein the account management services include:
   a plurality of authentication services;
   at least one session service;
   at least one account service; and,
   at least one password service.

26. The method of claim 15, wherein the account management services include:
   a plurality of authentication services;
   at least one session service;
   at least one account service; and,
   at least one password service.

* * * * *